United States Patent [19]

Desserrieres et al.

[11] Patent Number: 4,736,340
[45] Date of Patent: Apr. 5, 1988

[54] PROCESSOR GENERATING CONTROL PROGRAMS FOR A PROGRAMMABLE CONTROLLER

[75] Inventors: René Desserrieres, Grenoble; René Doucet, Le Touvet; Dominique Thillet, Domene, all of France

[73] Assignee: La Telemecanique Electrique, France

[21] Appl. No.: 634,245

[22] Filed: Jul. 25, 1984

[30] Foreign Application Priority Data

Jul. 25, 1983 [FR] France ................................ 83 12268

[51] Int. Cl.⁴ ............................................. G06F 15/46
[52] U.S. Cl. ................................................... 364/900
[58] Field of Search ... 264/200 MS File, 900 MS File

[56] References Cited

U.S. PATENT DOCUMENTS 4,488,258 12/1984 Struger et al. ...................... 364/900
4,570,217 2/1986 Allen et al. ...................... 364/900 X Primary Examiner—Thomas M. Heckler
Attorney, Agent, or Firm—William A. Drucker

[57] ABSTRACT

A terminal for generating programs usable by a programmable controller comprising: a screen; a keyboard having more especially a set of keys assigned to graphic symbols and a processor for generating, from the data entered on the keyboard, a program usable by the controller and storage thereof. The symbols of at least one contact type graphic representation mode and a sequential type representation mode are assigned to said graphic keys.

19 Claims, 11 Drawing Sheets

FIG. 7a
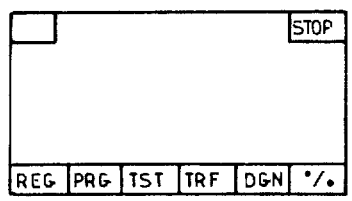
FIG. 7b
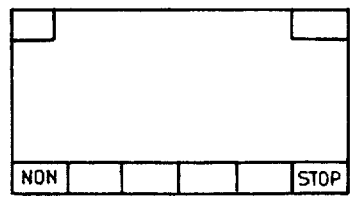
FIG. 7c
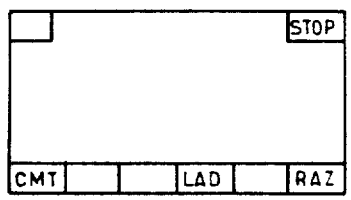
FIG. 7d
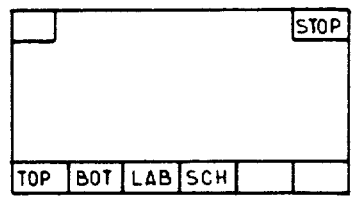
FIG. 7e
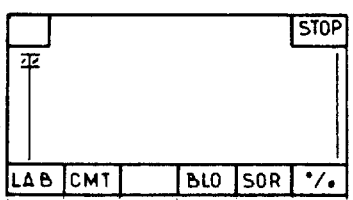
FIG. 7f
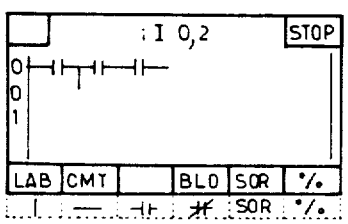
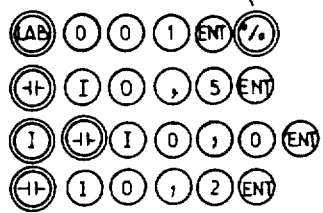
FIG. 7g
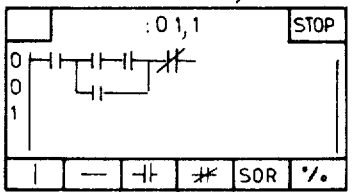
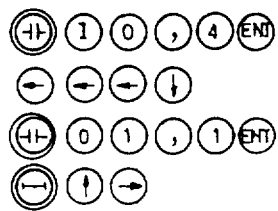

DESIRED OBJECTS?

PROCESSOR GENERATING CONTROL PROGRAMS FOR A PROGRAMMABLE CONTROLLER

BACKGROUND OF THE INVENTION

1. Field of the Invention

The present invention relates to a terminal for designing, programming, starting-up and/or maintaining an automatic control using a programmable controller.

2. Description of the Prior Art

It is generally known that a programmable controller usually comprises a given number of inputs for connection to the detection elements (sensors) of the process, a given number of control outputs for connection respectively to each of the actuators of the process and a processor for ensuring the sequential flow of the operations (control of the actuators) which the process must carry out, taking into account the data supplied by the detectors. For ensuring the timing of these operations, this processor uses a program specific to the process which it is desired to control. This program is generally generated in a computer or similar in an appropriate evolved language then, after processing by the computer (compliation), retranscribed into machine language so as to obtain an object program directly usable by the controller. This object program may then be transmitted to the controller directly by a connection provided for this purpose between the computer and the controller. It may also be stored in a peripheral memory such for example as a magnetic tape, a disk or even a memory programmable by the user (PROM), for example an erasable programmable memory (EPROM). In this case, the controller must necessarily be equipped with a corresponding read-out unit, for example a magnetic tape reader or a disk reader or even a connector for connecting the programmable memory.

Now, like all data processing systems, programming of the controller by conventional methods is carried out in two phases, namely:

a phase for analyzing the automatic control desired and which requires an analyst competent both in automatic working and in data processing and a programming phase properly speaking requiring purely data processing knowledge.

It is clear that this duality of competences required for programming forms a considerable obstacle to the widespread use of programmable controllers. To try to overcome this disadvantage, terminals have already been produced comprising a keyboard, a screen and a processor for defining the automatic controls by means of diagrams formed on the screen in accordance with a graphic representation mode identifiable by the processor. In this case, the programming of the controller no longer requires an extensive data processing knowledge. The operator need only form the diagrams of the automatic control on the screen whereas the processor generates the program directly from these diagrams.

At the present time, a so-called "contact" graphic representation method is available for this which consists in representing the automatic control in the form of contacts and relay coils, as well as function blocks representing members such as counters, programmers, arithmetical operators etc. This graphic representation method is suitable for generating relatively simple automatic controls. On the other hand, it is not very practical in the case of more complex automatic controls, more especially because it does not show sufficiently clearly the sequential flow of the operations carried out by the process.

The aim of the invention is then to overcome this disadvantage. It therefore proposes a terminal which allows a controller to be programmed by using a graphic representation method which consists in the combination of the "contact" representation method and a so-called "sequential" representation method which springs from a method of analysis consisting in breaking down the operation of the machine or of the processs to be automated into a succession of steps and transitions, all chained together. With each step is associated a list of actions which are carried out when this step is active.

SUMMARY OF THE INVENTION

To arrive at this result, the terminal of the invention comprises: a screen; a keyboard comprising at least one assembly of function keys, an assembly of keys assigned to graphic symbols and an assembly of keys for introducing more especially data relative to the automatic control; and a processor for providing scanning of the keyboard, the graphic representation on the screen of at least the graphic symbols introduced by the keyboard, with their useful parameters, the processing of the data entered on the keyboard, the generation from this data of a program usable by the controller and storing of this program.

This terminal is more particularly characterized in that to said graphic keys are assigned the symbols of at least one graphic representation mode of the contact type and a sequential type representation mode, and in that the processor is designed so as to be able to generate the program of the controller following a sequence of use comprising the following phases a first phase during which there is formed if required on the screen, using the corresponding keys of the keyboard, a "contact" type representation of the safety arrangements and of the working modes of the process;

a second phase during which a "sequential" type graphic representation is formed on the screen using the corresponding keys of the keyboard, defining the sequence of steps and transition conditions of the automatic control and, possibly, immediately after definition of each of the transitions, a contact type representation of the receptivities associated with this transition, and a third phase during which a "contact" type graphic representation is formed on the screen by means of the corresponding keys, defining the actions of the automatic control which must be carried out when the steps which are associated therewith are active.

More precisely, the processor may effect storage of the source program in a form usable by the controller in a random access memory (RAM) integrated with the terminal and able to be read if required by the controller (direct connection of the terminal). It may also be designed so as to allow storage of the source program in a read-only memory (ROM) such as a magnetic tape, a disk or even programmable memories of the PROM or EPROM type. It may further comprise interfaces for connection to a printer or even to a modem.

Of course, the invention is not limited to the keys of the keyboard mentioned above. This latter may more particularly comprise:

(a) An alphabetic keyboard for example of the QWERTY type, whose keys comprise, as a first function, the capital letters of the alphabet or, as a second function (Shift), the punctuation characters, signs, brackets etc . . . , with use of the shift key; this alphabetic keyboard may further comprise special function keys, for example a key (SH) enabling the second function of the alphabetic keys (Shift); a key (RC) for returning the pointer to the beginning of the line; keys (SH) and (RC) for return to the line; a key (SP) for creating a blank space; keys (ON) and (OFF) for switching the terminal on or off; a key (a) enabling or inhibiting the sound signal indicating errors; and a key (PR) controlling copying from the screen on to a printer connected to the terminal.

(b) A digital keyboard comprising ten digital keys (from 0 to 9), the comma and a key (ENT) for enabling storage of the instructions entered on the keyboard, (c) function keys possibly comprising a key (ZM) for causing the pointer to appear or for enlarging the symbol pointed to by the pointer, for example for displaying the reference of a contact or a coil, the parameters of a function block or else, for displaying the sequential diagram associated with a macro-step which represents a succession of several steps; four keys bearing arrows facing upward, downward, to the right, to the left, which serve for moving the pointer over the screen, or for causing stored data to pass across the screen in the case where the slider or pointer is not present; a key (INS) for effecting an insertion on the screen; a key (CLR) for clearing the memory enabling of the screen and which allows the chaining of the screens to go back a level; and a key (QU) for leaving the displayed level in order to go back to the first screen of chaining.

(d) said graphic keys.

It should be noted that the graphic keys may be divided up into two separate keyboards, namely a keyboard for the contact graphic representation mode and a keyboard for the sequential graphic representation mode.

However, according to another feature of the invention, these graphic keys are dynamic keys, i.e. keys associated with configurations, symbols and functions which vary depending on the context of use of the terminal. In this case, the processor is adapted so as to display on the screen, preferably at the level of its lower line, a zone (display line) for identifying the functions of each key for a given context of use. It should be noted that this display line which serves for representing the graphic symbols assigned to the dynamic keys for the two above-mentioned graphic representation modes, may further serve for displaying the different "menus" or "sub menus" which allow the terminal to pass over from one type of operation to another or from one menu to another. To this end, the display line displays for each of the configurations proposed by a given "menu", a symbol, preferably memotechnical, corresponding to a key. The processor may further be designed for dividing the screen of the terminal into five zones, namely a display zone, an address display strip, an event zone, a state of the automatic control zone and the above-mentioned display line. The display line may serve for displaying multiple data. It serves in particular for the graphic representation of the automatic control.

Thus, in the case of a contact representation mode, it may contain:

either n lines of m input contacts and an output coil, the horizontal or vertical connections between contacts being shown in broken lines, or function blocks and their parameters.

In the case of a sequential representation mode, the display zone may contain the steps and transitions of the sequential diagram. The address display strip is for displaying the references of the contacts, coils and function blocks displayed on the screen.

The event zone comprises up to three characters:
F: presence of one or more forced bits,
!: presence of a fault in the terminal or the controller, this character being able to wink in the case of a new fault,
A: this character lights up and possibly winks in the case of dangerous manipulation for certain manual operations.

The action of the Zoom key with the pointer positioned on one of the three characters causes display on the screen of:
the list of the forced bits
the list of the active bits
a message indicating the dangerous manipulation.

The state zone of the controller may comprise the following three indications: RUN, STOP, TEST.

As was mentioned above, the processor of the terminal is designed so as to recognize and use the symbols of the "contact" graphic representation mode which appear more especially in the input combinative, in the output combinative and in the representation of the receptivities associated with the transitions of the sequential type graphic representation mode. Consequently, the processor may be further designed, without that involving appreciable transformation of the terminal, for forming the automatic control solely by means of the "contact" representation mode.

This mode of use may be selected because of the "menu" functions assigned to said dynamic keys.

BRIEF DESCRIPTION OF THE DRAWINGS

One embodiment of the invention will be described hereafter by way of non limitative example with reference to the accompanying drawings in which:

FIGS. 7a to 7l are schematical views of the screen of the terminal for illustrating the operating mode of data acquisition according to the "contact" graphic representation mode of the automatic control assigned to the machine shown in FIG. 5;

DESCRIPTION OF THE PREFERRED EMBODIMENT

Figure 1:
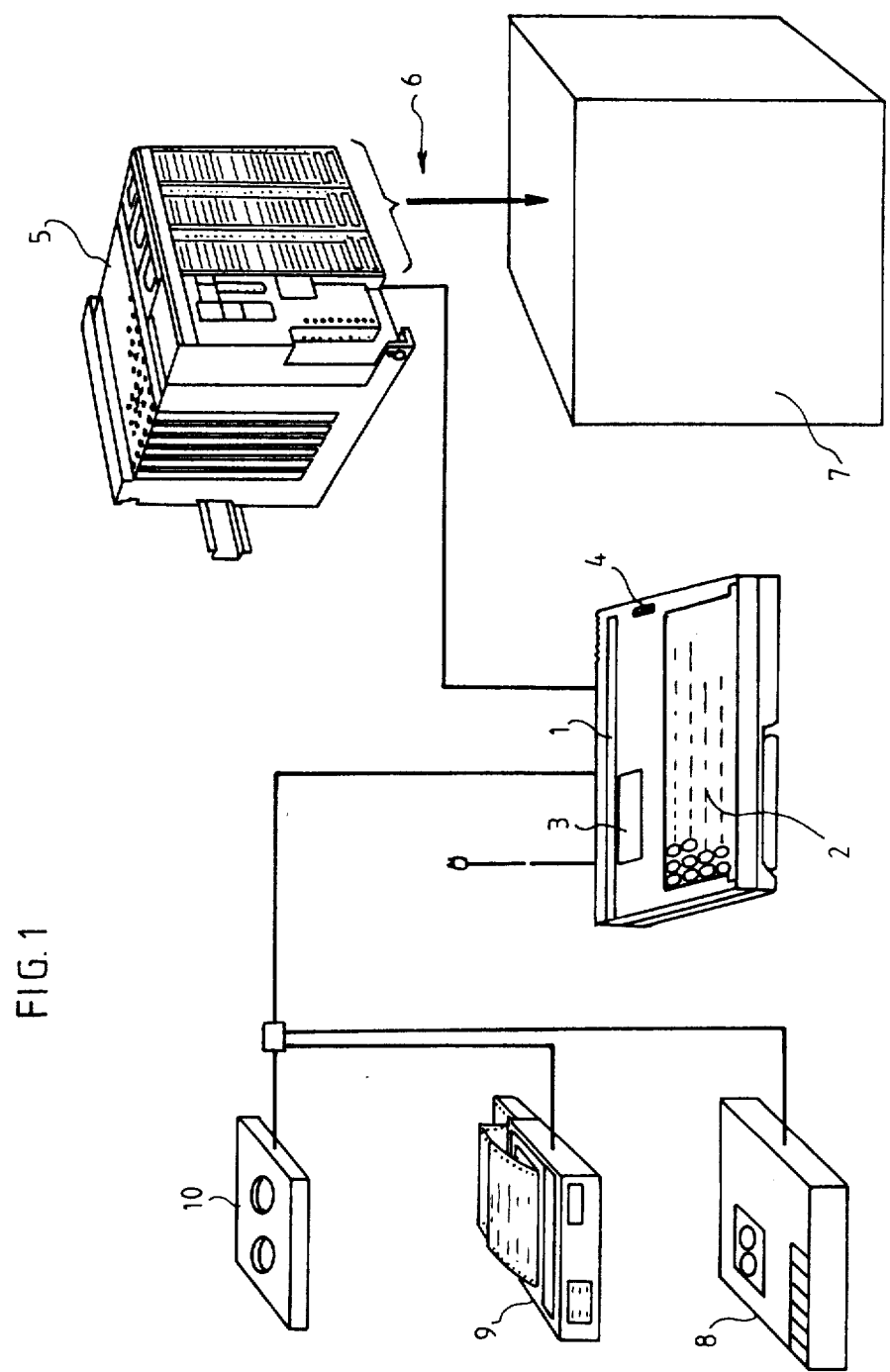
FIG. 1 shows schematically an installation comprising a terminal connected to a controller for controlling a process and to peripherals.

With reference to FIG. 1, said installation comprises first of all a terminal 1 incorporating in the same case, a keyboard 2 and a liquid crystal display screen (LCD) 3 whose contrast may be adjusted by means of a knob 4. Of course, screen 3 could be independent of the case of the terminal and could consist of a cathode-ray tube monitor.

This terminal 1 is connected, for example by a series connection, to the processor of a conventional type controller 5 whose inputs and outputs 6 may be adapted into several modules disposed in several boxes. In this case, so as to facilitate addressing, these inputs and outputs may be referenced in the following way:

I x y, z for an input

O x y, z for an output in which expressions
the letters I and O show that it is an input or an output,
the letter x is replaced by the number of the box,
the letter y is replaced by the location number of the module in the box,
the letter z is replaced by the number of the (bit) input or output in the module.

Controller 5 is connected by its inputs to the detection elements of the process 7 and by its outputs to the different controlled elements (actuators) of the process 7. It further comprises a connection device for connecting a ROM cartridge containing the specific program of the automatic control which provides control of the process. This cartridge may comprise one or more memories programmable by the user, for example of the PROM or EPROM type.

Such as shown in FIG. 1, terminal 1 is further connected:
to a digital cassette reader-recorder 8 for safeguarding the source program generated by terminal 1 or also for loading the RAM of the terminal;
a printer 9 of conventional type;
a modem 10 (modulator-demodulator) for providing remote communication through a telephone line.

Terminal 1 may further comprise a connection device for conecting ROM cartridges, namely more especially:
programming and regulation cartridges for programming the controller by means of the terminal;
regulating the cartridges for providing the regulating and test functions of the controller;
user cartridges for containing the specific program of the machine or of the process to be automated and which in use are connected directly to the controller.

A programmable memory (EPROM) programmer is moreover incorporated in the terminal for transferring the contents of the RAM of the terminal to the ROM (programmable) cartridge connected to the terminal.

Figure 2:
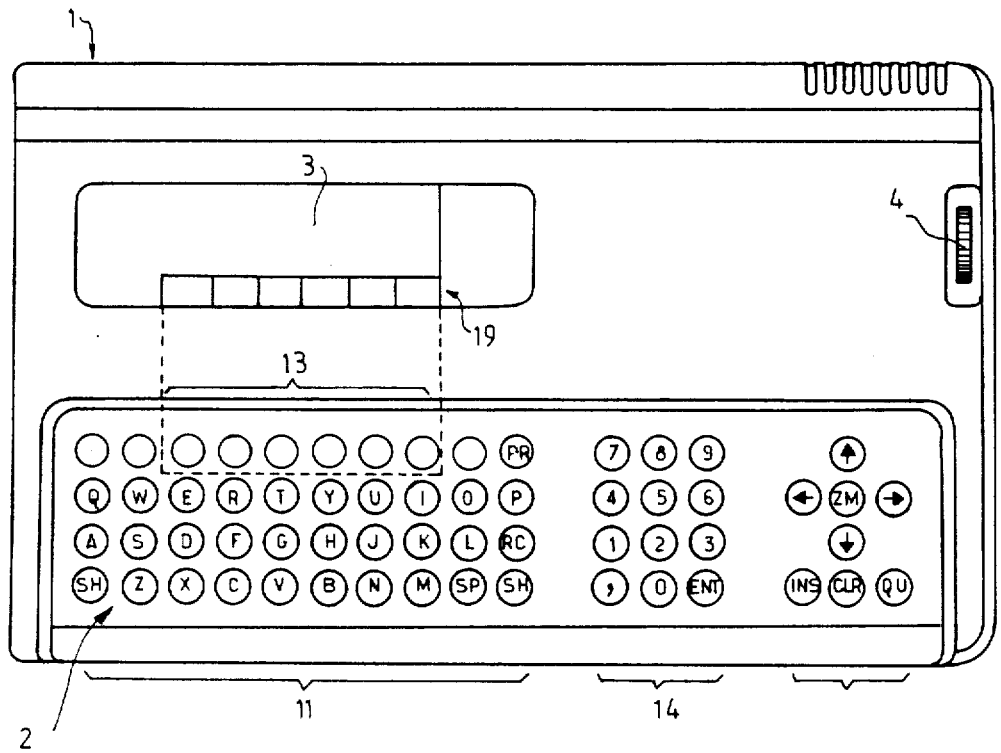
FIG. 2 is a front view, on a larger scale, of the terminal shown in FIG. 1.

As mentioned above, the keyboard of the terminal comprises (FIG. 2):
a conventional alphabetic keyboard 11 of the QWERTY type incorporating special function keys SH, RC, SP, ON, OFF and PR. The first line of this keyboard further comprises six dynamic keys 13 in which the symbols to which they are assigned are displayed on screen 3 and vary depending on the operating mode of terminal 1,
a digital keyboard 14 comprising the common and a key ENT,
function keys comprising the keys ↑ ↓ →←, a key ZM, a key INS, a key CLR and a key QU.

In so far as the screen of the terminal is concerned, it should be noted that the cut-out shape thereof by the processor is not fixed and depends on the operating mode and on the current control.

Figure 3:
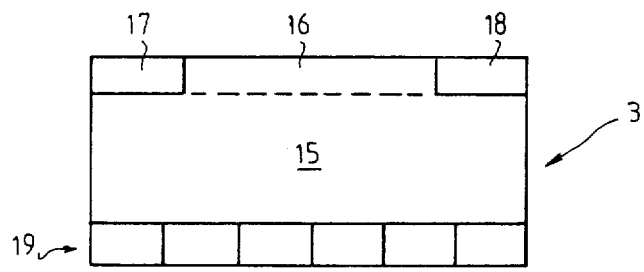
FIG. 3 is a schematical representation of the screen of the terminal with its divisions.

However, in most of the modes of use of the terminal the screen is divided into five zones as shown in FIG. 3, namely:
the display zone 15
the display strip 16
the event zone 17
the state zone for controller 18, and
the display line 19 for displaying the symbols of the six dynamic keys which is situated advantageously above said dynamic keys 13.

The assignments of these five zones have already been given and will therefore not be described again. It should however be noted that in the rest of the description the display zone 15 comprises, in the "contact" representation mode, four lines of nine input contacts and an output coil.

Figure 4:
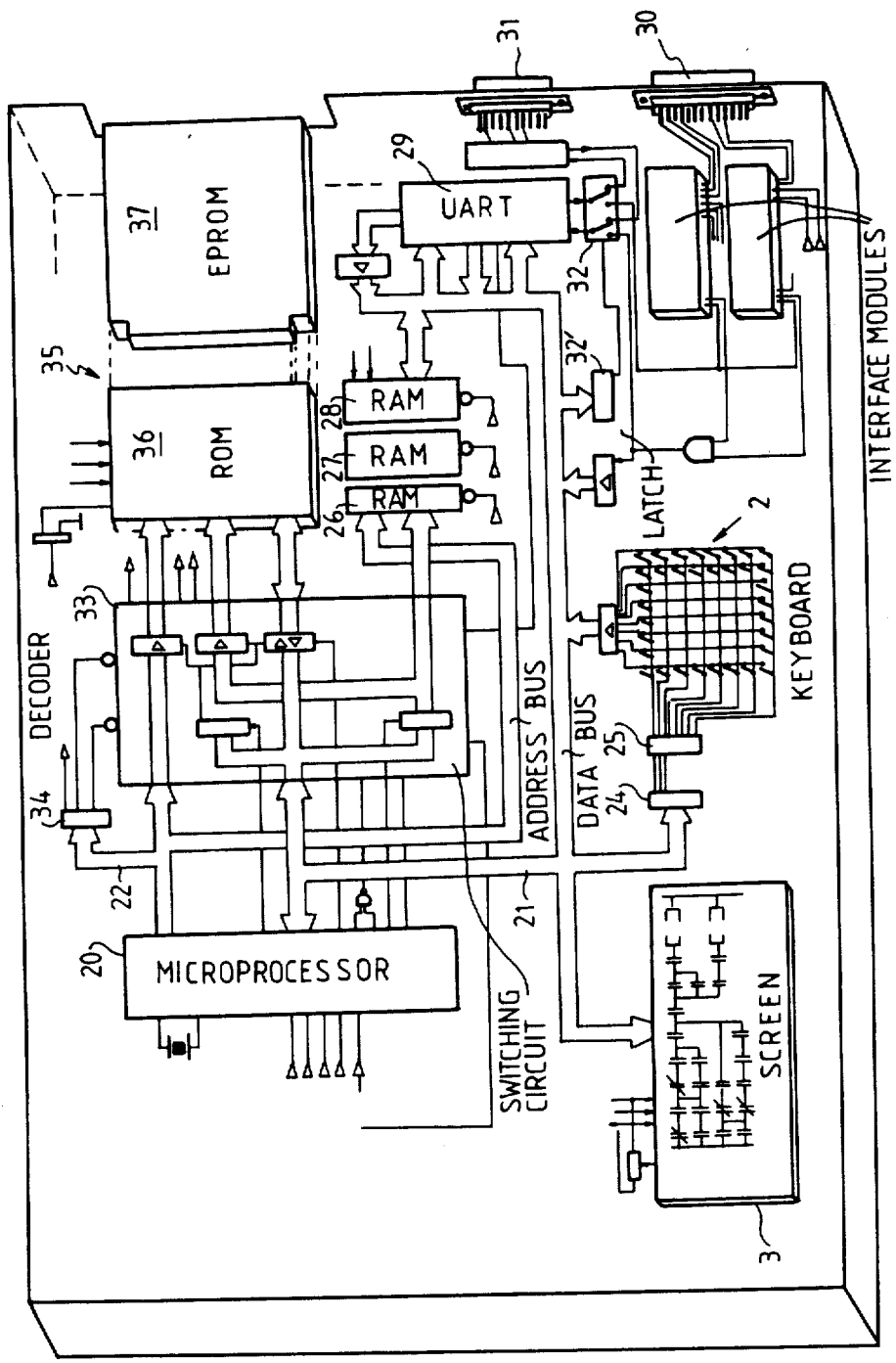
FIG. 4 is a diagram showing the material architecture of the processor.

With reference to FIG. 4, the processor of terminal 1 comprises a microprocessor 20, for example a semiconductor NSC 800 from the Société Nationale or an 8085 from the firm INTEL, from which extend a data bus 21 and an address bus 22.

The data bus 21 is more particularly connected:
to the liquid crystal display (LCD) forming the screen 3 of the terminal;
to the input of keyboard 2 through a latch 24 for preserving the data intended for keyboard 2 and presented temporarily on bus 21 and through a decoder 25; the output of keyboard 2 is connected unidirectionally to the bus 21;
to an assembly formed of three RAM blocks 26, 27, 28;
to a universal asynchronous receiver-transmitter 29 (UART) having a parallel input connected to the conductors of bus 21 and a sequential output connected to the front connectors (controller or peripheral connection) 30, 31 of terminal 1, through a switch 32 driven from data generated on bus 21 by means of a latch 32';
and, through a switching circuit 33 driven from data generated by the address bus 22 and decoded by a decoder 34, to a storage assembly 35 possibly comprising a read only memory 36 (ROM or EPROM), a plugable read only memory 37 for example of the PROM or EPROM type and possibly a PROM or EPROM programmer.

The data bus 22 is connected:
to the decoder 34 for controlling the switching circuit 33;
to the storage assembly 35 through the switching circuit 33, and
to the assembly formed of the three RAM's 26, 27, 28.

As mentioned above, the construction of an automatic control with the terminal 1 is effected by means of the "contact" and "sequential" graphic representation modes. The main characteristics of these two graphic representation modes will be described hereafter.

CONTACT GRAPHIC REPRESENTATION MODE

Contact type graphic representation uses symbols representative of the input contacts (reference of the inputs I x y, z of the controller) and of the output coils (reference of the outputs O x y, z of the controller) the symbol $$\underset{\underline{\quad(\ )\quad}}{I\,x\quad y,z}$$

represents a closure contact which is enabled when the input signal which drives it I x y, z is in state 1, the symbol $$\underset{\underline{\quad(\,/\,)\quad}}{I\,x\quad y,z}$$

represents an opening contact which is enabled when the input signal which drives it I x y, z is in the state 0.
the symbol $$\underset{\underline{\quad(\ )\quad}}{O\,x\quad y,z}$$

represents a forward coil whose output is in state 1 when the contact line which controls it is enabled (in state 1),
the symbol $$\underset{\underline{\quad(\,/\,)\quad}}{O\,x\quad y,z}$$

represents a reverse coil whose output is in state 0 when the contact line which controls it is enabled (in state 1),
the symbol $$\underset{\underline{\quad(\,L\,)\quad}}{O\,x\quad y,z}$$

represents a latch coil. The output of this coil passes to state 1 as soon as the contact line which controls it is enabled. This output remains in state 1 as long as it is not reset by the latch coil having the same reference,
the symbol $$\underset{\underline{\quad(\,U\,)\quad}}{O\,x\quad y,z}$$

represents an unlatch coil the output of this coil passes to the zero state as soon as the contact line which controls it is enabled. This output remains in state 0 as long as it is not set to 1 by the unlatch coil having the same reference,
the symbol $$\underset{\underline{\quad(\,J\,)\quad}}{n^*\text{ of network}}$$

represents a program jump. When the action line of this coil is enabled, the program jumps to the immediately referenced downstream network after reading of this coil,
the symbol $$\underset{\underline{\quad(\ )\quad}}{O\,x\quad y,Z}$$

represents a safeguard output. The output "O x y, z" will take on, after a mains cut, the state that it had immediately before (0 or 1). All the outputs may be safeguarded. The non safeguarded outputs will remain at 0 after mains cut off.

The contact graphic representation mode further uses symbols representative of elements having particular functions such as timers, counters, programmers, shift registers, arithmetic or logic operators etc . . . .

These symbols are shown in the form of rectangular blocks representing one or more inputs and one or more outputs. The type of function assigned to this block is indicated by a letter inscribed inside the block:
T Timing
C Counter
M Monostable
R Register
"nothing" arithmetic or logic function.

The parameters relative to these special functions are introduced into the terminal immediately after the block, but are not written into the network.

Thus, in order then to know the proper parameters of the function block the following operations should be carried out:

press the zoom key (ZM) for displaying the pointer,
place the pointer at the top and to the left of the block
by using the arrowed keys.
press the zoom key (ZM) so as to cause the block to
appear on the whole screen 3 with all its parameters.
In the programming or regulation mode, the slider
moves automatically from zone to zone so as to define
or modify each parameter.

By pressing the zoom key (ZM) again, the screen of a complete network reappears.

An example of forming an automatic control elaborated by means of a contact type graphic representation will be described hereafter.

EXAMPLE 1

In this example the process to be automated consists of a machine for boring and cutting metal bars.

Figure 5:
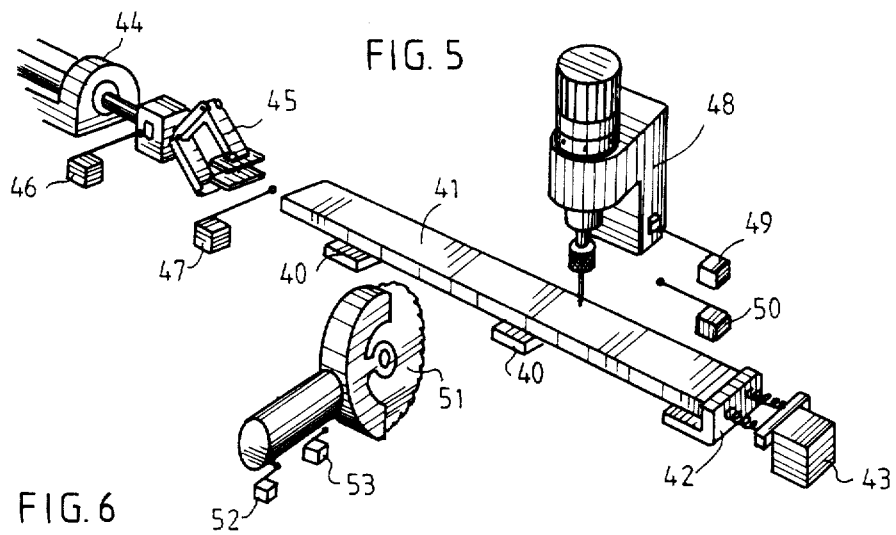
FIG. 5 shows schematically a machine for boring and cutting metal bars.

Such as shown in FIG. 5, this machine comprises more particularly:
- a support 40 on which metal bars 41 are disposed;
- a stop 42 against which one end of bar 41 may be applied, this stop 42 being equipped with a "bar in abutment" sensor 43 (I O,4);
- a hydraulic cylinder 44 equipped with a gripping mechanism 45 for moving bar 41 axially in translation, the forward end of travel and rearward end of travel positions of this cylinder 44 being respectively detected by sensors 46, 47 "cylinder rearward", "cylinder forward";
- a drill 48 movable vertically above bar 41, this drill 48 comprising means for controlling the rotation, raising and lowering thereof;
- means (not shown) for controlling spraying during boring;
- two sensors 49, 50 for detecting the top point (I O,0) and the low point (I O,1) of drill 48;
- a circular saw 51 movable transversely with respect to bar 41, this saw 51 comprising means for controlling the rotation, stopping, advance and backward movement thereof;
- two sensors 52, 53 for detecting the forward end of course and rearward end of course positions of saw 51.

The sequential flow of the operations carried out by this machine are to be the following:
bar 41 disposed on support 40 is pushed against stop 42 by the action of the hydraulic cylinder 44;
drill 48 begins to move downward with rotation of the drill and simultaneous spraying. When drill 48 arrives in the bottom position I O,1 it rises again. The rotation and spraying are then stopped;
as soon as drill 48 rises again, saw 51 is set in rotation, then advances until it comes into the forward end of travel abutment I O,3 in which position it is stopped for a time "t" for removal of barbs. Then it returns rearwardly I O,2 and stops;
at the end of the cycle the machined bar 41 is discharged and a new cycle may begin.

The first step for elaborating the automatic control consists in the assignment of the input/outputs of the controller 5 by using the previously described addressing mode (I x y, z for the inputs, O x y, z for the outputs). The following table 1 gives an example of assignment:

TABLE 1

Assignment: action or detection

Figure 6:
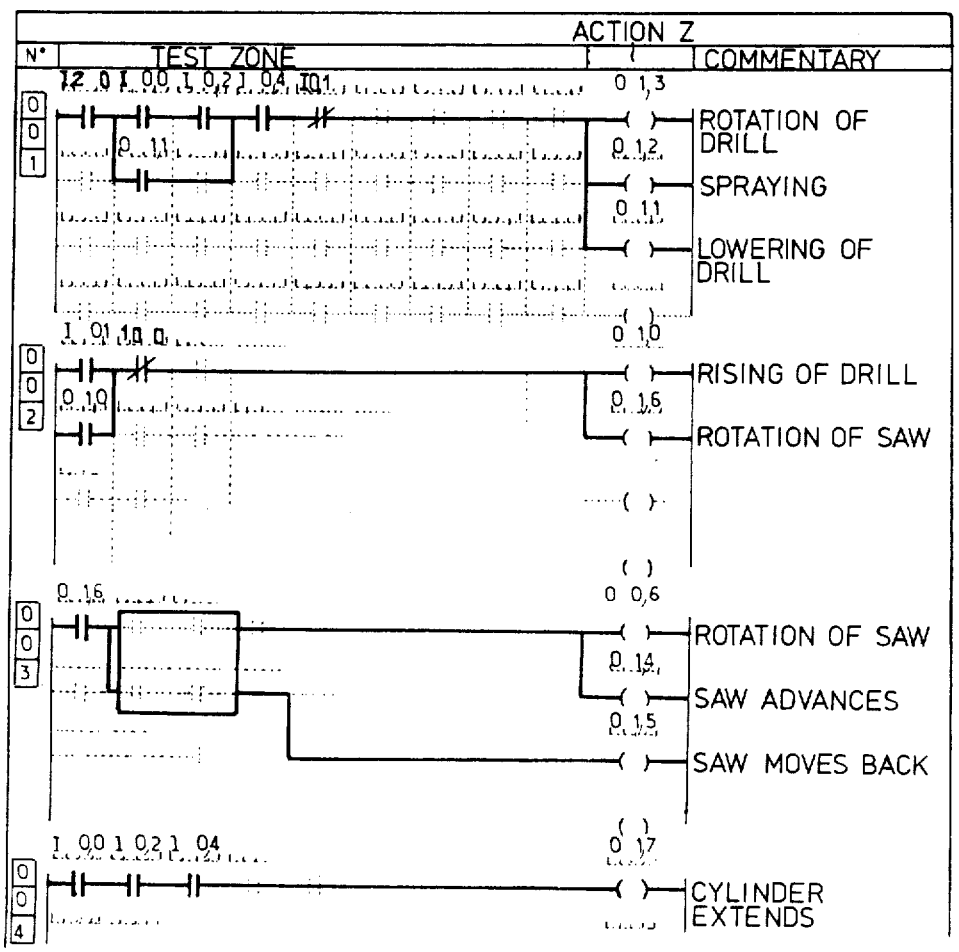
FIG. 6 is a contact type diagram of the automatic control for driving the machine shown in FIG. 5.

I O,0: drill 48 at the top
I O,1: drill 48 at the bottom
I O,2: saw 51 at the rear
I O,3: saw 51 at the front
I O,4: bar 41 in abutment
I 2,0: automatic operation switch
O 1,0: upward movement of drill 48
O 1,1: downward movement of drill 48
O 1,2: spraying of drill 48
O 1,3: rotation of drill 48
O 1,4: saw advances
O 1,5: saw 51 moves back
O 1,6: saw 51 rotates
O 3,0: cylinder 44 extends
O 3,1: cylinder 44 retracts FIG. 6 shows the contact type graphic representation of the automatic control, this representation being handwritten on a form specially designed for this purpose.

This representation comprises four groups of contact lines called networks, which are numbered (001, 002, 003, 004) on the left of the Figure. A network is an assembly of one to four contact lines in parallel having vertical connections therebetween or not. In these networks, the input control members (push buttons, switches . . . ) are symbolized in the form of relay contacts. They are all grouped together in the left hand part of the contact lines (test zone) and may be at most 9 in series per line. They are referenced I O,0 to I 2,0 in this example.

The control members (motors, relay coils . . . ) are represented in the form of coils, shown obligatorily in the right hand column of the relay diagram, which forms the action zone. These coils are referenced O1,0 to O1,7 in this example.

The timing function (network 003) is represented by a function block having two input and output lines. The elaboration of the previously defined automatic control by means of the terminal may then be carried out as follows:

A source program designed for elaborating the program of the controller from the contact graphic representation mode is fed into the terminal. This may be performed for example by inserting a programming cartridge (ROM, EPROM) into the connection system provided for this purpose. Then the terminal is connected to the controller for in line use.

The terminal then carries out a series of self tests, automatically identifies the type of control connected, then displays a connection screen such as the one shown in FIG. 7a. On this screen, the display line assigns to the dynamic keys memotechnical symbols forming a first menu, namely:

The symbol
REG—Regulation
PRG—Programming mode
TST—Test
TRF—Transfer
DGN—Diagnostic
%—Second function of the dynamic keys (Shift).

For entering a programming mode, the dynamic key PRG is then used. The in line programming takes place on a stopped controller. If the controller is executing a program, the terminal signals the fact and gives the possibility of stopping it so as to enter into the programming mode. For this, the dynamic key STOP is pressed which has appeared on the display line following the action on the dynamic key PRG (FIG. 7b).

If the controller is stopped, the screen is as shown in FIG. 7c in which the display line displays the following symbols:

CMT—Commentary
LAD—"contact" representation programming
RAZ—reset

Then the "contact" representation program is called with the dynamic key LAD. Thus a screen is obtained such as the one shown in FIG. 7d in which the display line displays the following symbols:

TOP—Beginning
BOT—End
LAB—Label
SCH—Search.

To create a new contact network, the key INS (function key of the keyboard) must be pressed. A blank network appears (FIG. 7e) with, in the display line, the main graphic symbols of the contact representation mode, (contact, coils etc . . . ). The pointer is present at the top left hand of the screen.

Figure 7H:
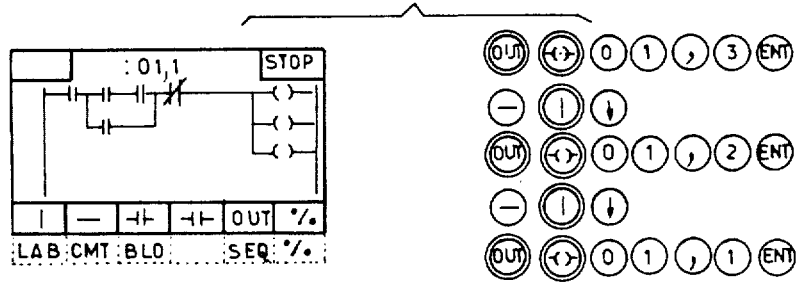

Data acquisition for the first network (OO1) of FIG. 5 may then take place as follows:

The label of the first network is introduced by means of the keys (LAB) (O) (0) (1) (ENT) then the first contact and its reference by the keys (%) (⊣⊢) (I) (2) (,) (0) (ENT). The vertical connection and the second contact are obtained by means of keys (I) (⊣⊢) (I) (0) (,) (0) (ENT), the third contact and its reference by means of keys (⊣⊢) (I) (0) (,) (2) (ENT) (FIG. 7f) and the fourth contact and its reference by means of the keys (⊣⊢) (I) (,) (4) (ENT). For acquisition of the data of the parallel contact, the data of the fourth contact is first of all acquired in series by means of keys (⊣⊢) (I) (O) (,) (4) (ENT). The pointer is brought to the bottom of the previously plotted vertical connection by means of the keys (←) (←) (←) ( ↓ ). The parallel contact is plotted by means of the keys (⊣⊢) (0) (1) (,) (1), (ENT) then the horizontal and vertical connections are formed by means of the keys (⊢⊣) ( ↑ ) (→) (FIG. 7g). The data may then be acquired for the coils of the action zone, as shown in FIG. 7h. First of all a first vertical connection is formed and the data of the first coil is acquired by means of the keys (OUT) ( ─( )─ )(O) (1) (,) (3) (ENT). The pointer is positioned by means of the keys (←) (/) ( ↓ ), a vertical connection is formed and the data of the second output is acquired by means of the keys (OUT) ( ─( )─ ) (0) (1) (,) (2) (ENT). The pointer is positioned by means of the keys (Θ) (/) ( ↓ ) then the data of the third output is acquired by means of the keys (OUT) ( ─( )─ ) (0) (1) (,) (1) (ENT). The network thus formed may then be validated by pressing the key (ENT). The data acquisition of the second and fourth networks is achieved in a similar way and will therefore not be described.

Figure 7I:
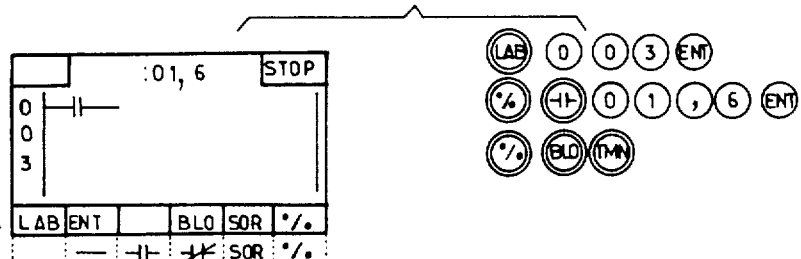

The third network of the automatic control shown in FIG. 6 includes a block representative of the timing function. To form this network, the circuit situated before the block is first of all created in the way shown in FIG. 7i. Previously, the label of the network is introduced by means of the keys (LAB) (0) (0) (3) (ENT); the data of the first contact is acquired and its reference by keys (%) (⊣⊢) (0) (1) (,) (6) (ENT) then the timing block is called by means of the keys (%) (BLO) (TMN).

Figure 7J:
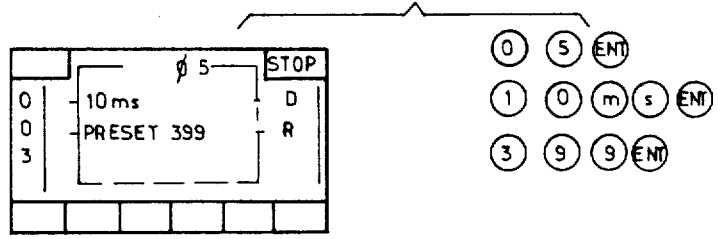

The timing block then appears on the screen (FIG. 7j) in the form of a rectangle having two inputs and two output. Then the parameters of the block are introduced, namely:

the timing number by the keys (O) (5) (ENT)
the 10 ms time base by the keys (1) (0) (M) (S) (ENT)
the pre-selection value: 399 by the keys (3) (9) (9) (ENT).

Figure 7K:
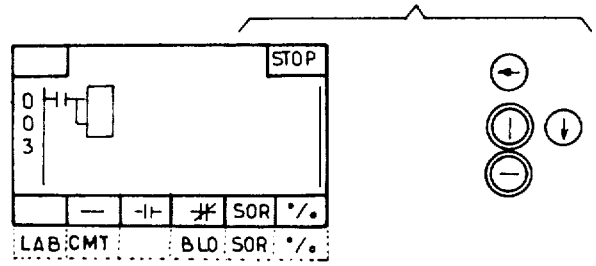

The connection of the second input of the timing block is obtained by positioning the pointer key (←) introducing the vertical connection, keys (|) ( ↓ ) and forming the horizontal connection, key (—) (FIG. 7k). It only remains then to effect the data acquisition of the outputs.

Figure 7L:
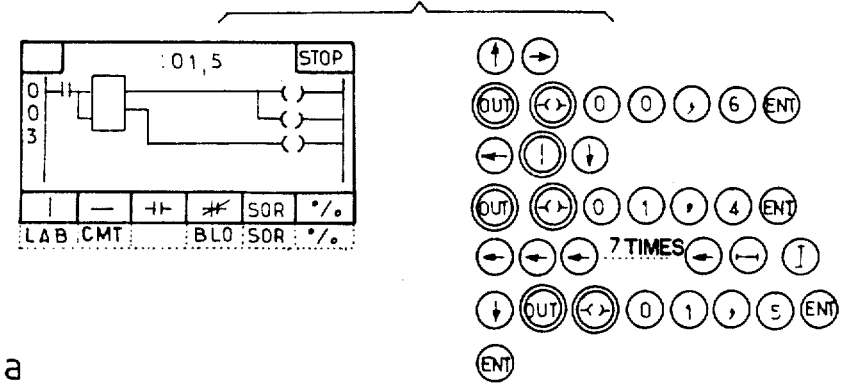

For this, as shown in FIG. 7l,
the slider is positioned by means of the keys (≡) (→);
the first output and its reference are introduced by the keys (OUT) ( ─( )─ ) (0) (0) (,) (6) (ENT);
the slider is moved back and the vertical connection is formed by means of keys (←) (/) ( ↓ );
the second output and its reference are introduced by means of the keys (OUT) ( ─( )─ ) (0) (1) (,) (4) (ENT);
the slider is moved back and the vertical connection is formed by the key (←) repeated seven times, the key (—) and the key (|);
the third output and its reference are introduced by means of the keys ( ↓ ) (OUT) ( ─( )─ ) (0) (1) (,) (5) (ENT)
and then the whole network is validated again with the key (ENT).

Once all these operations finished, the terminal has the program source of the controller stored in its dynamic memory. However, in practice, this program should be touched up more especially by detecting and correcting the errors which may have arisen during the data acquisition of the networks.

For this, we come back to the first network by means of the dynamic keys (SCH) (TOP) then it is checked whether this first network is correct. Then the downstream network is caused to appear with the key ( ↓ ) and so on . . . . If, for example, an error exists in the second network: a closure contact has been introduced instead of the closure contact I O, 1. Then the pointer is caused to appear by pressing the key zoom (ZM). The pointer is positioned on the contact to be modified with the keys ( ↓ ) (→) (→), the correct contact and its reference are written again by means of the keys (⊣⊢ ) (I) (0) (,) (1) (ENT), then the corrected network is validated by means of the key (ENT). Then the other networks of the automatic control are verified in a similar way. Once the program has been checked, the execution mode is initiated by pressing the key (CLEAR). The controller may then comprise an indicator light for indicating that the program is being executed. Simultaneously, the word RUN appears in the state zone situated at the top right of the screen of the terminal. To check the correct execution of the program, the cycle of the machine may be simulated by positioning the different sensors in the operating order. If the controller cannot be connected to the machine or to a machine model, the different sensors may be simulated by means of switches connected to the inputs.

Documentation and filing of the program elaborated by the terminal or of the graphic representation of the automatic control introduced on the screen may take place in the following way:
- either by printing the program and/or its graphic representation with the printer which is connected to the terminal;
- or by transferring the program stored in the RAM of the terminal to a ROM cartridge (EPROM) by means of the EPROM programmer integrated in the terminal.

FUNCTIONAL TYPE GRAPHIC REPRESENTATION MODE

It is known generally that any industrial process may be broken up into a succession of well defined elementary tasks or actions. This analysis of the process and the breaking up thereof into a sub assembly of tasks consists in creating a sequential type diagram.

Figure 8A:
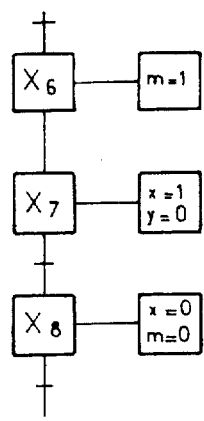
FIGS. 8a to 8e are schematical representations for illustrating the principle of a sequential type diagram.

As shown in FIG. 8a, the tasks are generally carried out in a given order and are grouped together in steps represented by blocks. Each end of operation generally conditions the passage to the next step. This passage is called transition. The transitions indicate the possibilities of evolution between steps, a step only being able to become active if the preceding step is active. The activation of a step causes the deactivation of the preceding step.

Figure 8D:
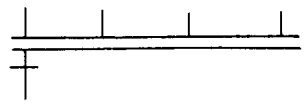
Figure 8E:
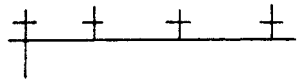
Figure 8B:
Figure 8C:
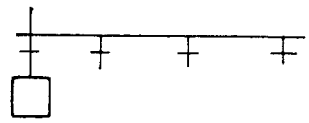

A step may be succeeded by several parallel steps. If these steps are to be initiated simultaneously, it is a question of an AND divergence (FIG. 8b). If each one has its own activation transition, it is then an OR divergence (FIG. 8c). Similarly, several parallel steps may converge towards a single step. In the case of a AND convergence (FIG. 8d), there is only a single common transition between the parallel steps and the next step. For an OR convergence (FIG. 8e) each parallel step has its own transition towards the next step. In a complex automatic process, several sequences or groups of actions may be simultaneous and develop independently. In this case, the sequential diagram will be broken up into several branches.

Figure 9:
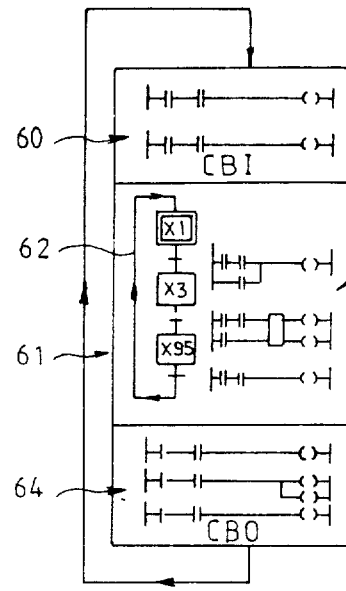
FIG. 9 is a diagram for illustrating the principle of the functional representation mode.

As mentioned above, the terminal of the invention allows programs to be elaborated which may be used by a controller using a graphic representation mode which combines the contact type representation mode with a sequential type graphic representation mode. This graphic representation mode, called hereafter functional mode, comprises three phases, namely the input combinative (CBI), the sequential phase (SEQ) and the output combinative (CBO) (FIG. 9). The input combinative 60 consists of the phase during which all the safety arrangements of the program such as mains cut, guard dog ... and the safety arrangements related to the operating modes: manual, automatic etc. ... are processed. Some steps may be initialized directly or activated in the case of particular events. This phase is programmed in the contact graphic representation mode in the above described way.

The sequential phase is an essential phase for defining the step-transition chaining. The graphic representation 61 of this sequential phase takes place in two stages.

(a) a first stage during which a sequential type representation 62 is effected, similar to the one shown in FIG. 8a for defining the chaining of the steps and the transitions. A single instruction is specific to this functional diagram: it is block "Xi" identifying the step of index "i" so that each step may be described and recalled independently. Each transition is tied graphically to the associated upstream step. Of course, the number of steps and transitions is limited depending on the configuration of the terminal and/or of the controller (for example to 96 steps and 96 transitions). The initial steps must be declared during the data acquisition thereof in the program; a step is initial if the program remains stopped there when the controller is switched on. The steps may be chained together, either in linear sequences, or in parallel branches. A divergence may initiate a limited number of parallel branches, for example six. The number of AND divergences and convergences may be limited for example to 16. On the other hand, the number of OR divergences and convergences may be unlimited;

(b) a second stage during which the receptivities 63 associated with the transitions are represented in contact language. The data of these receptivities 63 may be acquired on the screen, either immediately after definition of the associated transition or in a subsequent phase.

The output combinative step 64 is a phase during which the actions related to each step are defined in accordance with the contact graphic representation mode. With each step Xi of the sequential graphic 62 are associated one or more contact networks representative of all the actions to be carried out during the activity of this step.

ELABORATION OF AN AUTOMATIC CONTROL BY MEANS OF THE FUNCTIONAL TYPE GRAPHIC REPRESENTATION MODE

First of all the terminal is connected to the controller and memory cartridge are inserted as in the previously described example so that a connection screen (FIG. 10a) is obtained in the type of the one shown in FIG. 7a in which the display line assigns to the dynamic keys the symbols PRG (program) EXC (execution) REG (regulation) TRF (transfer) DGN (diagnostic) and % (second function of the dynamic keys (Shift)).

Figure 10A:
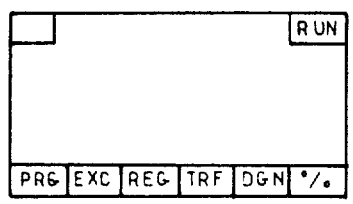
FIGS. 10a to 10d are views of the screen of the terminal illustrating the main preliminary operating phases for effecting data acquisition according to the functional type graphic representation mode.
Figure 10B:
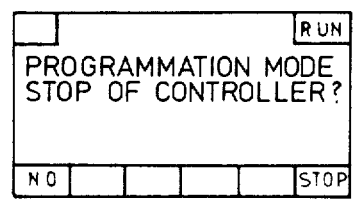

Then the programming mode is selected with the dynamic key PRG, which causes the screen shown in FIG. 10b to appear which corresponds to the one shown in FIG. 7b.

If the terminal is connected in line with a controller which is executing a program, execution thereof is stopped by pressing the key STOP. If not, the key NO is pressed so as to obtain the programming input screen shown in FIG. 10c.

This programming input screen displays on the display line the four following symbols assigned to the dynamic keys:
LAD—Contact type graphic display
FD—Functional type graphic display
CLM—Clear memory
CMT—Commentary data acquisition (limited for example to five characters).

Figure 10C:
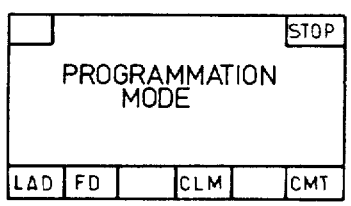
Figure 10D:
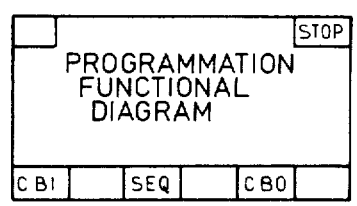

Actuation of key FD causes the screen shown in FIG. 10d to appear whose display line displays the symbols for choosing one of the three phase of the functional diagram:
CBI—Input combinative (contact representation)
SEQ—Graphic sequential
CBO—Output combinative (contact representation).

Figure 11A:
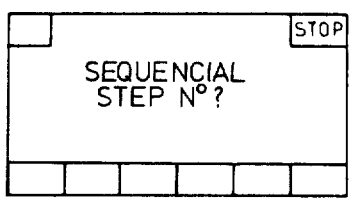
FIGS. 11a to 11i are schematical views of the screen of the terminal for illustrating the operating mode for data acquisition according to the graphic sequential mode.
Figure 11B:
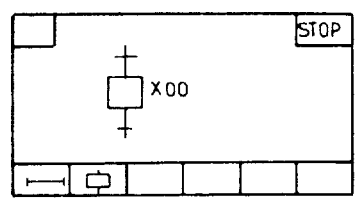

Data acquisition of the input combinative and of the output combinative which is effected in contact graphic representation which takes place similarly to the one previously described and will not be described again. The input in the graphic sequential mode is obtained by pressing the dynamic key (SEQ) shown in FIG. 10d. This key causes the screen shown in FIG. 11a to appear which requests the number of the first step of the sequence. The data acquisition of this number (for example between 0 and 96) is performed by means of the digital keys and is then validated by the key (ENT) then the screen shown in FIG. 11b is obtained which displays the screen with its upstream and downstream transitions. On this screen, the display line displays at least two symbols, namely:
the symbol ( ▢ ) for declaring that this step is initial. The program begins its execution at the initial steps.
the symbol (⊢) for introducing an OR divergence or convergence.

Figure 11C:
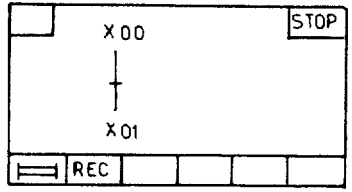

The rest of the function diagram is obtained by moving the pointer downwards by means of the key ( ↓ ) so as to obtain the screen shown in FIG. 11c for defining the step and the downstream transition. The pointer is then positioned on the downstream step for acquiring the data of its number by means of the digital keys and the validation key (ENT).

On this screen, the display line indicates the following symbols:
the symbol (⊨) for acquiring the data of an AND divergence or convergence, and
the symbol (REC) for passing to the mode for acquiring the data of the receptivity associated with the transition pointed to by the pointer and this in contact graphic representation.

Figure 11D:
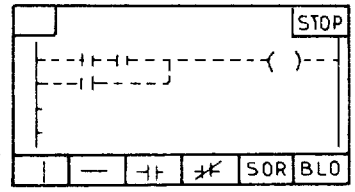

Actuation of the dynamic key (REC) allows the screen shown in FIG. 11d to be obtained. On this screen, a single output (coil), virtual since it is non programmable, automatically occupies the action zone of the network. The data acquisition of all the conditions in the transition is then proceeded with by using the dynamic keys for programming the elements of the contact lanugage.

An example of receptivity has been shown with broken lines in FIG. 11d. For the data acquisition, the operating mode is as mentioned above in connection with the data acquisition of the contact representation mode. Display of the downstream step is obtained by moving the pointer downward which causes the appearance of a screen similar to the one shown in FIG. 11b. The data acquisition of linear sequences is then achieved by a succession of steps and transitions.

The user may, depending on his preferences, either define the conditions of receptivity of each transition immediately after each step, or define the whole of the automatic control in sequential representation then cause each transition to reappear on the screen and then define it in contact representation after pressing the key (REC)

It should be noted that a timing of value "Xi V" is automatically associated with each step "Xi" when this latter is active. The time base of this timing is fixed for example at one second. The value "Xi, V" may be read by the user or the program for checking how long the step "Xi" has been active. When a step "Xi" remains active after a given period of time, for example 9999 seconds (2 h 47 m), the current value "Xi,V" goes back automatically to 0 and is again incremented.

Figure 11E:
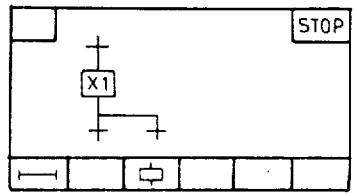

The OR divergences and convergences are formed on the screen displaying one step between two transitions. For this, the key (CLEAR) is pressed to come back to the step search screen and the number of the desired step is entered. The OR divergence is obtained by placing the pointer above the downstream transition then creating the divergence between two parallel branches by means of the dynamic key (⊢) (FIG. 11e).

Figure 11F:
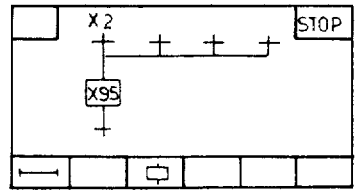

So as to form an OR convergence, the pointer is placed below the upstream transition then the dynamic key (⊢) is pressed (FIG. 11f).

The terminal may for example acquire the data of up to four parallel branches.

By moving the slider horizontally and vertically, the data of the number of each step above the convergence lines and below the divergences may be acquired.

The AND divergences and convergences are obtained on the screen displaying a transition between two step numbers. We come back to the screen displaying the upstream step by means of the key (CLEAR) then by indicating the number of this step.

Figure 11G:
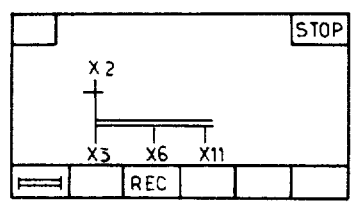
Figure 11H:
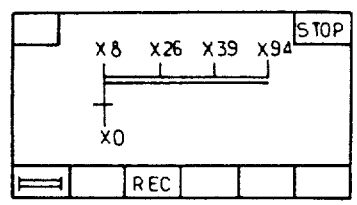

To form an AND divergence the pointer is placed below the downstream transition then the divergence is created by means of the dynamic key (⊨) (FIG. 11g). Similarly, an AND convergence is created by placing the pointer above the upstream transition and by actuating the dynamic key (⊨) (FIG. 11g). The dynamic key (⊨) creates therefore an AND divergence or convergence with a multiple juxtaposition possibility (for example triple).

The data acquisition of the number of the steps situated downstream of a divergence or upstream of a convergence is achieved by moving the pointer horizontally and vertically. The output of a sequential phase is obtained by means of the key (CLEAR) repeated twice.

Figure 11I:
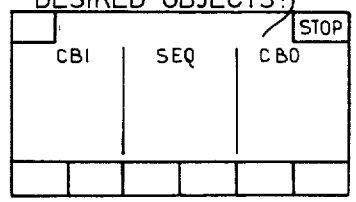

Modification of a functional diagram can only take place if the terminal is in the programming mode. To search for the step "Xi", we come back to the first search screen (FIG. 7d), then, by pressing the dynamic key (SCH), the "desired object" screen shown in FIG. 11i is caused to appear. The desired step "Xi" may then be defined in the zone SEQ. The screen of the functional diagram centered on the step Xi will then appear automatically.

When the step "Xi" is displayed, it is then possible to search for one of the steps upstream or downstream of this transition. For this, the pointer is caused to appear with the zoom key (ZM) then the pointer is moved so as to bring it onto the desired transition. The dynamic key (REC) displays the contact network of the receptivity associated with the transition, which may be modified like any other contact network.

After showing the modification on the screen, the new network is validated with the key (ENT).

The graphic sequential diagram may be modified in the same way as it was programmed; For that:
the number of the desired step is entered on the first screen displayed (FIG. 11a),
the pointer is placed on the elements to be deleted (step-transition pair, convergence, divergence);
then the key delete is used: (SH)+(INS).

If a graphic transition has been deleted, the associated receptivity programmed according to the contact representation mode will be destroyed. The data of the new associated receptivities will be acquired as for programming. Step and transition insertions take place graphically on the sequential diagram which may be modified step by step. The inserted transitions will be first of all defined graphically then on the terminal in the contact representation mode, with the dynamic key (REC) of the transition screen (FIG. 11c).

The following description illustrates one example of elaborating, in the functional type representation mode, the automatic control for ensuring operation of the machine shown in FIG. 5.

EXAMPLE II

Figure 12:
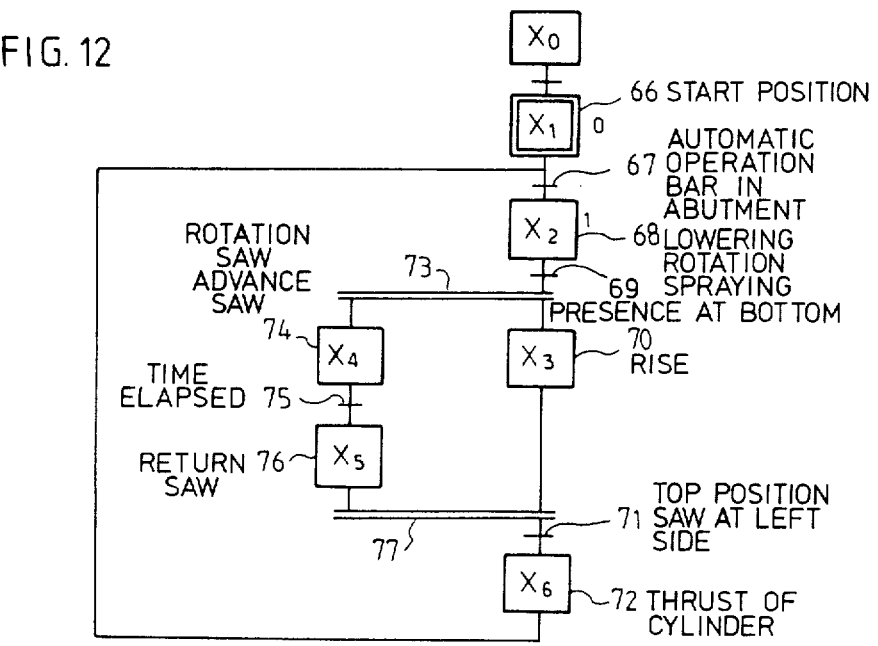
FIG. 12 is the diagram of the graphic sequence of the operations of the automatic control assigned to the machine shown in FIG. 5.

The sequential diagram of this automatic control was shown (in the sequential graphic representation mode) in FIG. 12.

This diagram comprises first of all a direct chain comprising successively:
an initial step (block 66) representative of the starting position of the automatic control;
a transition 67 (automatic operation, bar 41 in abutment);
a step 68 representing the lowering and rotation of drill 48 with spraying,
a transition 69 (presence of drill 48 in the bottom end of travel position);
a step 70 representative of the raising of drill 48;
a transition 71 (detection of drill 48 in the top position and of saw 51 in the rear end of travel abutment position);
a step 72 representative of the thrust of cylinder 44.

This direct chain is relooped upstream of the first transition 67. Moreover the circuit comprises, downstream of the second transition 69 an AND divergence 73 from which extends a parallel circuit comprising a step 74 representative of the rotation and advance of saw 51, a transition 75 (detection of the time elapsed by means of timer) and a step 76 representative of a return of saw 51. This parallel circuit is connected to the main chain, upstream of transition 71, through an AND convergence 77.

In order to be able to elaborate the functional diagram on the terminal, the different operations described in connection with FIGS. 10a, 10b, 10c are first of all carried out so as to obtain the screen for data acquisition of the functional diagram shown in FIG. 10d.

Figure 13A:
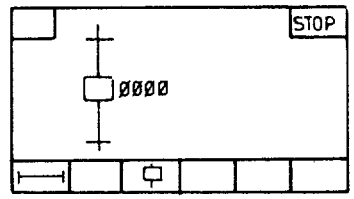
FIGS. 13a to 13h are schematical views of the screen of the terminal for illustrating the operation mode of data acquisition of the graphic sequential diagram shown in FIG. 12.
Figure 13B:
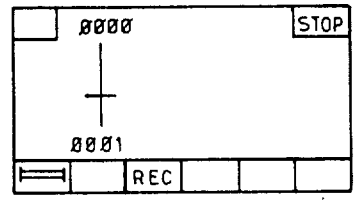

Then the programming of the input combinative is called for by means of the key CBI. Then the networks may be entered, in the contact representation mode, dealing with all the safety conditions and operating modes of the program. In the example shown in FIG. 5, the input combinative can only comprise one receptivity (contact) and one action (coil) for effecting an emergency stop (coil) for example in the case of an alarm on the detector (contact). Once this or these networks have been introduced, we come back to the selection screen (FIG. 10d) by means of the key (CLEAR) then the sequential mode is called up by the dynamic key (SEQ). Activation of this key then causes the screen shown in FIG. 11a to appear which requires a step number. The first step XO will be designated by the FIGS. ∅∅∅∅ (FIG. 13a) and it is declared "initial" step with the dynamic key (φ). As mentioned above, this initial step XO is the step at which the program remains stopped during switching on of the controller. Then the downstream step X1 is defined (FIG. 13b) by pressing the key (▫) and by entering the corresponding number ∅∅∅ 1 by means of the keys (1) (ENT) then the dynamic key (REC) is pressed for programming the receptivity associated with the transition between XO and X1.

Action on the dynamic key (REC) causes the symbols used in the "contact" graphic representation mode to appear on the display line of the screen. The receptivity associated with the transition XO/X1 may for example bring an output coil and two series disposed contacts into play, namely a contact I O,0 which is enabled when the drill is in the top position and a contact I O,2 which is enabled when the saw is in the rearward position.

Figure 13C:
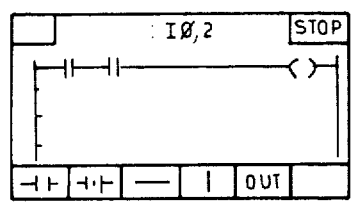

The data acquisition of this receptivity is then obtained by means of the following keys (FIG. 13c): (-⊦-) (I) (0), (,) (o) (ENTF) (-⊦-) (I) (0), (,) (2) (ENT) (OUT).

It should be noted that in FIG.f 13c only the reference of the second contact I, 0,2 is written in the display strip, the reference of the first contact (IO,0) having been squashed by the second. Then the network is validated by means of the key (ENT).

Figure 13D:
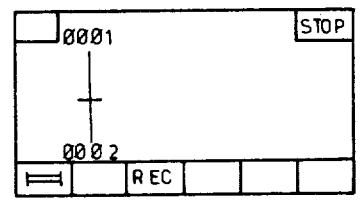

It should be noted that the conditions for transition between step Xo and step X1 are defined by this contact network which is "fictive" to the extent that the output coil can never control any real output. On the other hand, if the coil is activated, the transition is enabled and the next step X1 may be activated. Once the data of the receptivity has been acquired and validated, the connection between step X1 and step X2 is then defined which bears the number 0002 according to a procedure identical to the preceding one (FIG. 13d).

Figure 13E:
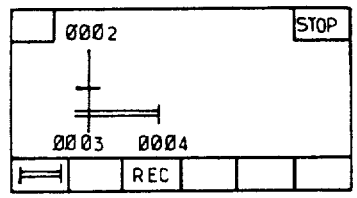
Figure 13F:
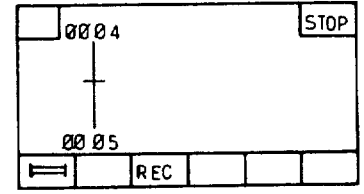
Figure 13G:
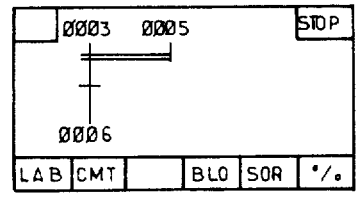
Figure 13H:
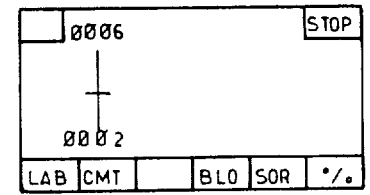

The data acquisition of the AND divergence between step X2 and steps X3 and X4 is provided by means of the key (⊢—⊣) (FIG. 13e). Then the data of step X5 (FIG. 13f), of the AND convergence between steps X5 and X3 towards step X6 (FIG. 13g) and of the relooping of the circuit toward step X2 (FIG. 13h) is acquired. The end of the sequential mode is declared by means of the key CLEAR (CL).

As mentioned before, the next phase consists in data acquisition of the output combinative, which comprises six networks in the contact type graphic representation mode which each correspond to the actions relative to the six steps of the sequential diagram.

Figure 14:
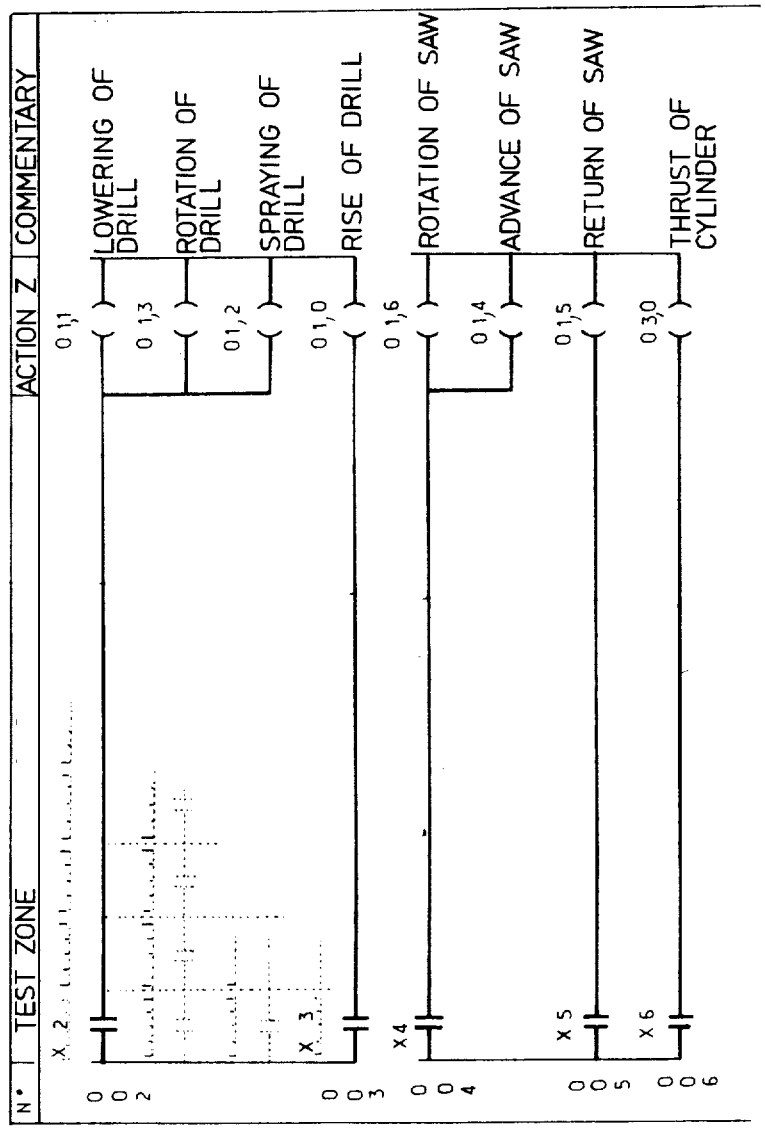
FIG. 14 is the diagram of the output combinative of the automatic control, in the contact graphic representation mode.

FIG. 14 shows, in the contact type representation mode, the diagram of the output combinative of the automatic control shown in FIG. 5.

In this diagram, the network bearing the label 002 comprises a contact X2 corresponding to step 68 of the sequential diagram shown in FIG. 12, which ensures the control (coils 01,1; 01,3; 01,2) of the following actions:
lowering of the drill 48,
rotation of the drill 48,
spraying.

The network bearing the label 003 comprises a contact X3 corresponding to step 70 of the sequential diagram and a coil 01,0 controlling the rise of the drill 48. The network bearing the label 004 comprises a contact X4 corresponding to step 74 of the sequential diagram, a coil 01,6 controlling the rotation of saw 51 and a coil 01,4 controlling the advance of saw 51. The network bearing the label 005 comprises a contact X5 corresponding to step 76 of the sequential diagram and a coil 01,5 controlling the return of saw 51. The network bearing the label 006 comprises a contact X6 corresponding to step 71 of the functional diagram and a coil 04,0 controlling the thrust of hydraulic cylinder 44.

Data acquisition of the output combinative is effected by coming back first of all to the screen shown in FIG. 10d by pressing the key CLEAR twice then pressing the dynamic key CBO indicated on this screen. Thus a screen is obtained allowing data acquisition in the "contact" type representation mode. This data acquisition may then be effected in the way described above and so will not be described again in detail. After validation of this data acquisition by means of the key CLEAR (CL), the program of the automatic control is contained in the RAM of the processor.

Of course, it is possible to proceed to the verification of this program before and/or during execution thereof.

An alternative embodiment of the present invention consists in only programming graphically the sequential parts such as shown in FIG. 12 then in using the alphanumeric means of the keyboard and pointing by zoom for programming the logic relations defining respectively the state equations of each output as a function of the inputs and other variables which condition it.

For example, the operator will acquire data for the receptivity associated with transition Xo/X1, after having pointed to it and selected it by zoom, by pressing the following keys:

| (I) | (0) | (,) | (I) | (.) | (I) | (0) | (,) | (2) | (Enter) | so as to obtain on the screen and store

| $X_1 > X_2$ | I0, 1 · I0, 2 |

Similarly, to acquire the data that the output O 0,3 is active in step $X_2$, after pointing and zooming on $X_2$, the operator will press the keys:

| (Set) | (0) | (0) | (,) | (3) | (Enter) | so as to obtain on the screen and store

| $X_2$ | Set | O0, 3 |

What is claimed is:

1. A terminal for generating a program usable by a programmable controller for automatic control of an industrial process including operating modes, successive steps of the program each comprising at least one action of the automatic control which must be executed when the step is active, and transitions between the successive steps, each of said transitions being controlled by a corresponding logic circuit including detection means, said terminal comprising:
   i. a display device;
   ii. a keyboard on which data can be entered by an operator, said keyboard having at least one first set of function keys, a second set of keys respectively assigned to graphic symbols which represent at least electrical contacts, coils, function blocks and electrical connections in a contact type representation, a third set of keys assigned to graphic symbols which represent at least the steps and the transitions in a sequential type representation, and a fourth set of keys for entering parameters associated to the graphic symbols, and
   iii. a processor having means for scanning the keyboard, means for displaying on the display device the graphic symbols introduced on the keyboard so as to form on the display device a diagrammatic representation of the automatic control and means for generating said program from the data entered on the keyboard for effecting said diagrammatic representation;

the processor further comprises means for effecting said diagrammatic representation according to a sequence comprising the following phases:
   i. a first phase during which there is formed on the display device, using at least the second set of keys, a contact type representation of the operating modes of the process;
   ii. a second phase during which there is formed on the display device, using at least said third set of keys, a sequential type representation of the successive steps and transitions,
   iii. a third phase during which there is formed on the display device, using at least said second set of keys, a contact type representation defining the actions of the automatic control which must be executed when the steps which are associated therewith are active, said sequence further comprising an additional phase dur- which there is formed on the display device, using at least the second set of keys, a contact type representation of the logic circuits associated with each of the transitions, said processor further comprising means for generating said program from said diagrammatic representation.

2. The terminal according to claim 1, wherein said additional phase takes place after said third phase and means are provided to cause each of said transitions formed during the second phase to reappear on the display device so as to effect the contact type representation of the logic circuit associated to this transition.

3. The terminal according to claim 1, wherein said additional phase is effected during said second phase.

4. The terminal according to claim 1, wherein said processor comprises a random access memory for storing said program.

5. The terminal according to claim 1, wherein said processor comprises means for storing said program in a read only memory.

6. The terminal as claimed in claim 1, wherein said keys assigned to the graphic symbols are divided into two separate keyboards, namely a keyboard for the contact type representaton and a keyboard for the sequential type representation.

7. The terminal according to claim 1, wherein said diagrammatic representation of the automatic control comprises a plurality of pictures which can be successively displayed on the display device and the keyboard comprises:
a set of alphabetic keys with at least a usual shift key and a usual return key;
a set of ten numeric keys with at least a comma key and a conventional enter key which serves for effecting a validation of the data entered on the keyboard;
the set of function keys which further comprise a zoom key for causing a pointer to appear on the display device, four arrow keys respectively pointing upwardly, downwardly, to the right and to the left for moving the pointer over the display device if said pointer is present and for displaying the entered data if the pointer is absent, a clear key for cancelling said validation and for passing from a picture which is present on the display device to a precedent picture and an insertion key for effecting an insertion on the display device; and,
the keys assigned to the graphic symbols.

8. The terminal according to claim 7, wherein said processor comprises means for causing the symbol indicated by the pointer to be enlarged when the zoom key is activated.

9. The terminal according to claim 7, wherein said processor comprises means for displaying information concerning the symbol indicated by the pointer when the zoom key is activated.

10. The terminal according to claim 7, wherein said processor comprises means for displaying a sequential diagram associated with a macro-step which represents a succession of several steps.

11. The terminal according to claim 1, wherein said keyboard comprises a set of dynamic keys, each having several functions.

12. The terminal as claimed in claim 11, wherein said processor comprises means for displaying on a display line of the display device, symbols for identifying the function of the dynamic keys.

13. The terminal as claimed in claim 12, wherein said processor comprises means for dividing the display device into at least:
an address display strip for displaying an address reference for each of the electrical contacts, of the coils and of the function blocks displayed on the display device;
a display zone for displaying the diagrammatic representation of the automatic control; and
the said display line on which are displayed symbols for identifying the dynamic keys.

14. The terminal as claimed in claim 1, wherein said processor comprises means for displaying in a display zone of the display device, for the said contact type representation, a network having a capacity of n lines of m input contacts, an output coil, and a plurality of horizontal and vertical connections between the input contacts and the coil.

15. The terminal as claimed in claim 1, wherein said processor comprises a microprocessor from which extend at least a data bus and an address bus, said data bus being connected:
to a display unit including the display device;
to an input of the keyboard through a latch and a decoder, an output of this keyboard being connected unidirectionally to said data bus;
to an assembly of RAMs;
to a universal asynchronous receiver-transmitter having a parallel input connected to said data bus and a sequential output connected to internal connectors of the terminal through a switch driven from data generated on said data bus, and
to a storage assembly, through a switching circuit driven from data generated from the address bus and decoded by a decoder;
and said address bus being connected:
to the decoder serving to control the switching circuit,
to the storage assembly through the switching circuit and,
to the assembly of RAMs.

16. The terminal according to claim 15, wherein said storage assembly comprises connection means for plugging in a pluggable memory unit.

17. A terminal for generating a program usable by a programmable controller for automatic control of an industrial process including safety devices, operating modes, successive steps of the program each comprising at least one action of the automatic control which must be executed when the step is active, and transitions between the successive steps, each of said transitions being controlled by a corresponding logic circuit including detection means, said terminal comprising:
a display device;
a keyboard on which data can be entered by an operator, said keyboard having at least one first set of function keys, a second set of keys respectively assigned to graphic symbols which represent at least electric contacts, coils, function blocks and electrical connections in a contact type representation, a third set of keys assigned to graphic symbols which represent at least the steps and the transitions in a sequential type representation, and a fourth set of alphanumeric keys for entering parameters associated to the graphic symbols; and a processor having means for scanning the keyboard, means for displaying on the display device the data introduced on the keyboard so as to form on the display device a diagrammatic representation of the automatic control, and means for generating said program from said diagrammatic representation, wherein said diagrammatic representation is effected according to a sequence comprising the following phases:

a first phase during which there is formed on the display device, using the corresponding keys of the keyboard, a representation of the safety devices and operating modes of the process;

a second phase during which there is formed on the display device, using the corresponding keys of the keyboard, a sequential type graphic representation defining the chaining of the steps and transitions of the automatic control;

a third phase during which there is formed on the display device, by means of the corresponding alphanumeric keys, a literal type display of logic expressions defining the actions of the automatic control which must be carried out when the steps which are associated therewith are active, said sequence further comprising an additional phase during which a literal type display is formed of logic expressions defining logic circuits associated with each of the transitions.

18. The terminal as claimed in claim 17, using a sequential type representation mode and, depending on a choice by the operator, a contact type representation mode or a logic expression literal writing mode for said first phase, for said third phase and for said additional phase.

19. A terminal for generating a program usable by a programmable controller for automatic control of an industrial process including operating modes, successive steps of the program each comprising at least one action of the automatic control which must be executed when the step is active, and transitions between the successive steps, each of said transitions being controlled by a corresponding logic circuit including detection means, said terminal comprising:

a display device;

a keyboard on which data can be entered by an operator, said keyboard having at least one first plurality of function keys, a second plurality of keys respectively assigned to graphic symbols each representing an element of a diagrammatic representation of the automatic control; and a processor having means for scanning the keyboard, means for displaying on the display device the graphic symbols introduced on the keyboard so as to form on the display device the diagrammatic representation, and means for generating said program from the data entered on the keyboard for obtaining said diagrammatic representation, said second plurality of keys comprises a first set of keys respectively assigned to graphic symbols which represent at least electrical contacts, coils, function blocks and electrical connections in a contact type representation and a second set of keys assigned to graphic symbols which represent at least the steps and the transitions in a sequential type representation, and said diagrammatic representation comprises at least three distinct parts:

one first part comprising a contact type representation of the operating modes of the process, this first part being obtained by using said first set of keys;

the second part comprising a sequential type representation of the steps and the transitions of the automatic control, this second part being obtained by using at least said second set of keys, and a third part comprising a contact type representation defining the actions of the automatic control which must be executed when the steps which are associated therewith are active, this third part being obtained by using at least said first set of keys.

* * * * *